United States Patent
Dombroski et al.

(10) Patent No.: US 11,225,106 B2
(45) Date of Patent: Jan. 18, 2022

(54) SEALED REMOVABLE SPINDLE FOR A SPRING AXLE

(71) Applicants: Henry T. Dombroski, Boynton Beach, FL (US); Anthony Cunningham, Boynton Beach, FL (US)

(72) Inventors: Henry T. Dombroski, Boynton Beach, FL (US); Anthony Cunningham, Boynton Beach, FL (US)

(*) Notice: Subject to any disclaimer, the term of this patent is extended or adjusted under 35 U.S.C. 154(b) by 127 days.

(21) Appl. No.: 16/851,963

(22) Filed: Apr. 17, 2020

(65) Prior Publication Data
US 2020/0238758 A1 Jul. 30, 2020

Related U.S. Application Data

(63) Continuation-in-part of application No. 16/782,847, filed on Feb. 5, 2020, which is a continuation-in-part of application No. 15/891,587, filed on Feb. 8, 2018, now Pat. No. 10,618,351.

(51) Int. Cl.
| | |
|---|---|
| *B60B 35/08* | (2006.01) |
| *B60B 35/00* | (2006.01) |
| *F16C 3/02* | (2006.01) |

(52) U.S. Cl.
CPC ............ *B60B 35/08* (2013.01); *B60B 35/004* (2013.01); *F16C 3/02* (2013.01)

(58) Field of Classification Search
CPC ....... B60B 35/004; B60B 35/08; B60B 35/14; B60B 35/16; B60B 35/163; B60B 2320/10; B60B 2900/511; F16C 3/02
See application file for complete search history.

(56) References Cited

U.S. PATENT DOCUMENTS

| | | | |
|---|---|---|---|
| 844,893 A | 2/1907 | Raines et al. | |
| 937,316 A | 10/1909 | Marler | |
| 1,001,905 A * | 8/1911 | Tuller | ........................... 301/132 |
| 1,008,875 A | 11/1911 | Tennison | |
| 1,086,166 A | 2/1914 | Hall | |
| 2,370,773 A * | 3/1945 | Bradley | .................. B60B 35/04 |
| | | | 301/132 |
| 2,501,579 A | 3/1950 | Pointer | |
| 5,090,778 A | 2/1992 | Laudszun et al. | |
| 5,226,691 A | 7/1993 | Kane | |
| 5,757,084 A | 5/1998 | Wagner | |
| 6,299,259 B1 | 10/2001 | MacKarvich | |

(Continued)

FOREIGN PATENT DOCUMENTS

JP S649983 U * 1/1989

*Primary Examiner* — Kip T Kotter
(74) *Attorney, Agent, or Firm* — McHale & Slavin, P.A.

(57) ABSTRACT

A removable spindle assembly improvement comprised of a spindle housing end unit having a threaded cavity. A corresponding threaded removable spindle is torqued into the threaded cavity. The spindle has a tapered section that includes O-rings for creating a seal along the corresponding section of the cavity to prevent corrosion which assists in the elimination of spindle seizure within the spindle housing end unit's cavity. The spindle housing end unit's housing includes at least two threaded apertures that cooperate with sealed set screws for securing the spindle in place during operation. The set screws are placed apart at an odd number of 15 degree increments. This assembly facilitates easy removal and replacement of a spindle on a spring axle.

8 Claims, 16 Drawing Sheets

(56) References Cited

U.S. PATENT DOCUMENTS

| | | |
|---|---|---|
| 6,641,229 B1 | 11/2003 | Kosak |
| 7,125,084 B2 | 10/2006 | Dombroski et al. |
| 7,185,955 B2 | 3/2007 | Dombroski |
| 7,226,133 B2 | 6/2007 | Dombroski et al. |
| 7,234,783 B2 | 6/2007 | MacKarvich |
| 7,740,036 B2 | 6/2010 | Dombroski et al. |
| 8,205,526 B2 | 6/2012 | Dombroski |
| 8,777,241 B1 * | 7/2014 | Hamernik ............... B62D 7/18 280/93.512 |
| 10,202,002 B2 | 2/2019 | Carroll |
| 10,308,070 B1 | 6/2019 | Carroll |
| 2015/0145229 A1 | 5/2015 | Dunlap et al. |
| 2017/0297404 A1 | 10/2017 | Goettker |
| 2018/0297400 A1 | 10/2018 | Carroll |
| 2019/0168539 A1 | 6/2019 | Carroll |

* cited by examiner

SEALED REMOVABLE SPINDLE FOR A SPRING AXLE

CROSS REFERENCE TO RELATED APPLICATIONS

In accordance with 37 C.F.R. § 1.76, a claim of priority is included in an Application Data Sheet filed concurrently herewith. Accordingly, the present invention is a continuation-in-part of U.S. patent application Ser. No. 16/782,847, filed Feb. 5, 2020 entitled "SEALED REMOVABLE SPINDLE FOR A SPRING AXLE", which is a continuation-in-part of U.S. patent application Ser. No. 15/891,587, filed Feb. 8, 2018, entitled "REMOVABLE SPINDLE AXLE SEALING MECHANISM", the contents of which are hereby expressly incorporated by reference.

FIELD OF THE INVENTION

The invention relates to the field of trailer axles, and more particularly a spring axle having a spindle housing end unit that is designed to accept a removable spindle. The spindle housing end unit is assembled with a removable spindle that when assembled is sealed from corrosion and therefore be removed quickly and easily. The assembled spindle housing end unit with removable spindle is designed to be slip fitting into an axle manufacturer's existing axle tubing and welded permanently to make a complete spring axle with sealed removable spindles.

BACKGROUND OF THE INVENTION

A conventional boat trailer utilizes an axle secured to a trailer frame to support a wheel. The wheel is coupled to the axle by use of a wheel hub assembly. The wheel hub assembly employs inner and outer bearings with an associated inner and outer race, which permits rotational movement in relation to the axle. Proper lubrication of the bearings is critical in controlling heat and premature bearing wear. Larger trailers require a braking system, which can further add to the heat buildup.

Problems with the axles and the wheel assemblies are pronounced when the trailers are used to transfer boats, especially those used in salt water. For instance, a boat trailer may have been pulled for a long period of time, causing the axle and wheel assemblies to heat up. The boat trailer may be placed in the water before the metals have cooled, such as when unloading the boat. The heat build-up during normal operation of the trailer (i.e. bearing rotation and brake application) can result in very high axle and wheel assembly temperatures whereas when the axle is submerged, the quick high temperature change in the wheel assembly will create a vacuum and water can enter the wheel assemblies where corrosion will start on the bearings eventually creating bearing failure and possible spindle damage.

While axle assemblies, wheel assemblies, and brake assemblies could be constructed from high quality materials to lessen corrosion, the costs make it prohibitively expensive for the consumer. Further, even if an assembly is constructed from high quality materials, water and ions from dissimilar materials will tend to leach, leading to galvanic corrosion, especially when the materials are subjected to salt water.

U.S. Pat. No. 6,299,259 discloses a removable spindle axle for torsion axle assembly. In this disclosure, a torsion axle assembly has removable and replaceable spindle axles. The assembly comprises a tubular axle beam, an inner torsion bar seated inside the tubular axle beam, rubber cords positioned in the four corners of the tubular axle beam for providing resistance to the inner torsion bar, torsion arms rigidly secured to the inner torsion bar at opposing ends thereof, and removable spindle axles. A removable spindle axle generally includes a body of defined taper arranged and configured to be mounted in abutment with the spindle axle socket of the torsion arms, a threaded fastener for securing the spindle axle to the torsion arm, and a spindle end that is arranged and configured to mount a wheel and hub assembly thereon. A damaged spindle can be the result of many different circumstances, but commonly is the result of wheel bearing damage.

While the concept was to provide a readily removable and replaceable spindle, in reality, the spindle becomes nearly impossible to remove without great effort. The problem is a result of corrosion involving the threaded fastener; also known as a castle nut. The threaded fastener is typically used with a flat beveled washer and a cotter pin to prevent removal. It is impractical to match all the materials used in manufacturing, or employ materials having no iron content, making galvanic action. Most cost effective stainless steels include iron, which will begin to oxidize when exposed to an electrolyte, water being a known electrolyte. While water enables oxidation, salt water is a very good conductor; therefore, galvanic corrosion reactions are tremendously accelerated by salt water. Metal atoms can react with other elements, becoming charged. Once charged, they are attracted to water molecules and dissolve. For this reason, it is common for the threaded fastener, washer and cotter pin to become so corroded they have to be cut off from the spindle.

U.S. Publication No. 2017/0297404 discloses a removable spindle assembly for torsion axles. In this disclosure, a torsion axle arrangement is provided, wherein the spindle is mounted to the suspension link by insertion into a split socket at one end of the suspension link, which is inclined with respect to the longitudinal axis of the suspension link. That connection is maintained by a bolt passing through the suspension link, engaging a mating groove in the spindle, and then clamping the ends of the split socket together. The bolt is anchored to the suspension link by a threaded connection external to the suspension link. A chamfer or surface recess is formed in the surface of the suspension link for immediate source identification.

U.S. Publication 2015/0145229 discloses a removable spindle assembly for torsion axles. In this disclosure, a torsion axle arrangement is provided, wherein the spindle is mounted to the suspension link by a keyed connection facilitated with a selectively orient able disc, then fixed to the suspension link according to a given application. That connection is maintained by a bolt passing through the suspension link and engaging a mating groove in the spindle. The bolt is anchored within the suspension link by a threaded connection internal to the suspension link. The shape of the key can be selected as desired for immediate source identification.

U.S. Pat. No. 7,234,783 discloses an axle with removable spindle and cam key. In this disclosure, the axle assembly includes a spindle that extends through a mounting collar into the open end of the axle. A cam key moves through a key hole in the axle and registers with the cam slot of the spindle. The cam surface of the cam key is reversible, with the cam surface engaging either the bearing surface or the bearing surface of the spindle, to urge the spindle into or out of the axle.

U.S. Pat. No. 10,202,002 discloses a replacement spindle that can be removed for service or replacement after removing a weld. The spindle may have a threaded projection corresponding to a threaded bushing, which needs to be welded within an axle tube. The spindle may be screwed into place for use, then welded, then when removing the spindle, the weld needs to be ground off to unscrew the spindle for replacement.

U.S. Pat. No. 10,308,070 discloses an internally threaded axle tube and spindle assembly, where the spindle can be easily removed for service or replacement. The spindle may have threaded projection corresponding to the internal threads in the axle tube. The spindle may be screwed into place for use, then unscrewed for service or replacement.

What is needed in the industry is a spindle housing end unit with a removable spindle that is sealed from the environment for spring axles. The end unit which is designed to be slip fitting and welded into an axle manufacturer's existing axle tubing will hold a removable spindle that is sealed into the end unit to make a complete spring axle with a sealed removable spindle.

SUMMARY OF THE INVENTION

Disclosed are improvements for use with a removable spindle for spring axles. A removable spindle axle defined in this specification is used with a spindle housing end unit having a proximal and a distal end. The spindle housing end unit's distal end is one with a solid metal shaft that is square, rectangular or round stock that is designed to be fitted inside a spring axle's tube to be welded permanently. The proximal end includes a tapered body cavity with inner threads for mounting the removable spindle. The removable spindle is threaded into the spindle housing end unit, tightened into the threads and secured from loosening in the spindle housing end unit with at least one stainless steel set screw with thread sealant and a secondary retainer of a hexagonal semi-circular key. A hub assembly is then securable to the distal end of the removable spindle. One improvement is the O-rings on the tapered body of the removable spindle which hermetically seals the spindle from exposure to all environmental elements. A second improvement is that the spindle housing end unit with removable spindle is designed to be used with a manufacturers existing axle tubing.

In one embodiment, a first O-ring groove is formed along a first end of the tapered body for receipt of a first O-ring, and a second O-ring groove is formed along a second end of said tapered body for receipt of a second O-ring; the first and second O-rings hermetically seal an area of said removable spindle.

A further objective of the instant invention is to provide a further anti-loosening retainer by means of a 12-point dodecagon design around the spindle collar which, when the removable spindle is threadably inserted into the spindle housing end unit, a key having an opposing matched 12-point dodecagon design is inserted against the 12-point dodecagon grooved section of the removable spindle and is secured to the spindle housing end unit using two bolts.

Yet still another objective of the instant invention is to position O-ring grooves and O-rings on both ends of the tapered spindle to hermetically seal the tapered spindle to the housing to prevent corrosion of the tapered spindle and the housing.

Another objective of the instant invention is to position O-ring grooves and O-rings on both ends of the tapered portion of the spindle housing end unit to hermetically seal the removable spindle to the spindle housing end unit to prevent corrosion of the spindle and the housing.

Yet another objective of the instant invention is to provide an assembled spindle housing end unit with a removable spindle which is attachable to an axle manufacturers existing axle tubing by welding the solid shaft of the spindle housing end unit into the tubing. The solid shaft can be either round, square or rectangular to fit into or abutted on the manufacturers axle tubes.

Another objective of the invention is to teach the use of a 12-point dodecagon design placed between the O-ring grooves on the tapered portion of a spindle, and the mating spindle housing will use at least two set screws placed apart by an odd number of 15 degree increments to assure that at least one set screw is set into the 12 point dodecagon deviation to secure the spindle from moving without the need for a key.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
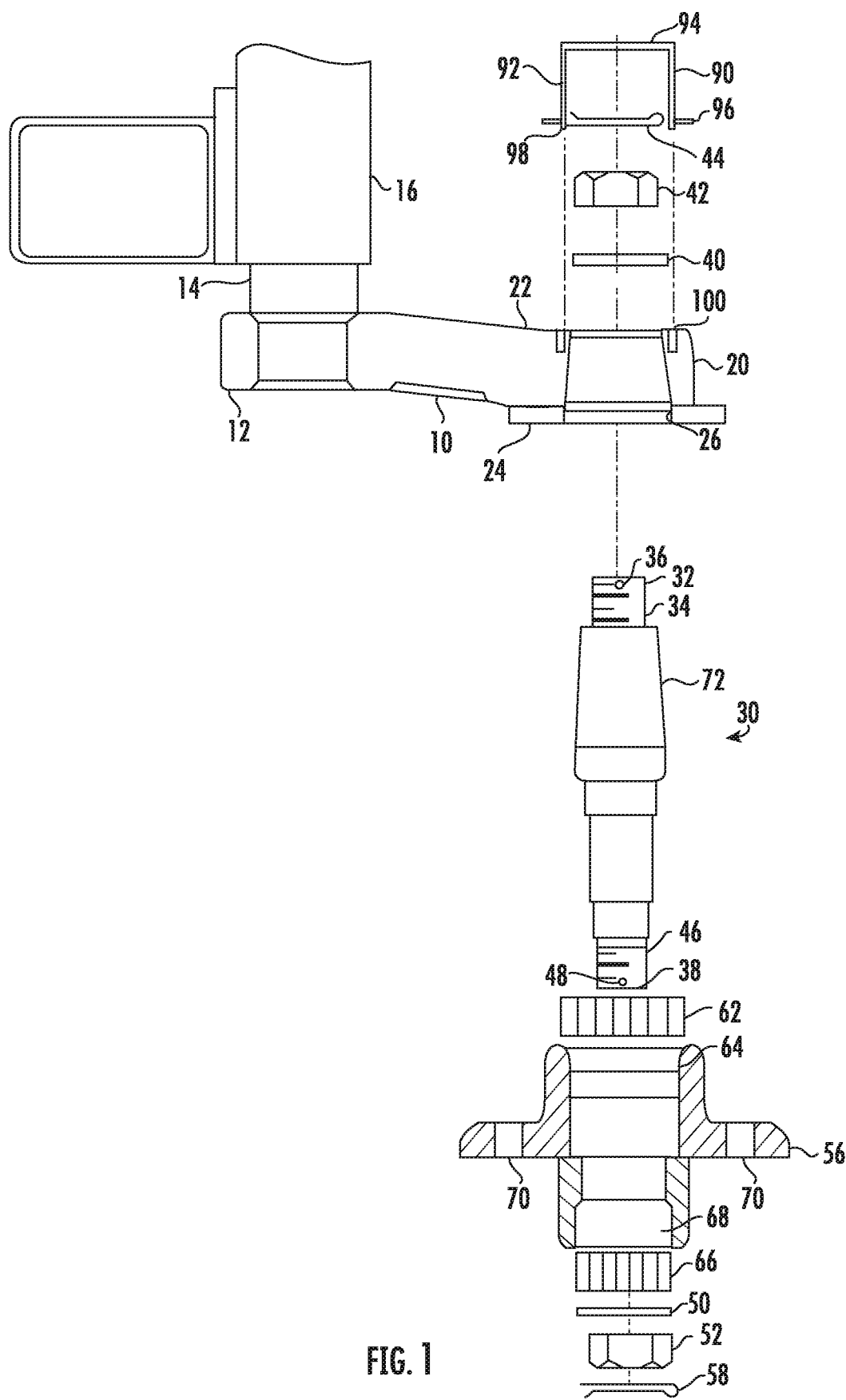
FIG. 1 is an exploded cross sectional side view of a spindle assembly with a grooved housing and fastener cover.

Referring to FIG. 1, illustrated is an exploded cross sectional side view of a spindle assembly with a grooved housing and a fastener cover. The torsion arm 10 has a proximal end 12 that is coupled to a torsion bar 14. The torsion bar 14 in the preferred embodiment has a square shaped bar placed within a square tube housing 16, which has rubber piping positioned along each inner corner of the square tube housing. The torsion arm 10 is further defined by a distal end 20 with an inside surface 22 and an outside surface 24 defining a tapered open-ended spindle axle socket 26 there between.

A spindle axle 30 is releasable securable to the torsion arm 10; the spindle axle having a proximal end 32 that is threaded 34 with a first cotter key hole 36. The proximal end 32 is the recipient of a washer 40 and threaded fastener 42 to prevent the proximal end from passing through the spindle axle socket 26 once installed. A first cotter key 44 is positioned in the first cotter key hole 36 to inhibit movement of the threaded fastener 42.

The distal end 38 of the spindle axle 30 is threaded 46 with a second cotter key hole 48. The distal end 38 receives washer 50 and threaded fastener 52 to secure the distal end to the wheel hub assembly 56 once installed. A second cotter key 58 is positioned in the second cotter key hole 48 to inhibit movement of the threaded fastener 52. The wheel hub assembly includes an inner bearing 62 for engaging an inner race 64 and an outer bearing 66 for engaging an outer race 68. The hub assembly 56 is used for mounting a wheel, not shown, using the wheel bolt holes 70.

The spindle axle 30 includes a tapered body 72 for mounting in the spindle axle socket 26 of the torsion arm 10, such that the proximal end 32 extends through the spindle axle socket 26 to the inside surface 22. The threaded fastener 42 is tightened to the proximal end 32 with reciprocal threads 34, securing the spindle axle 30 to the torsion arm 10. In this embodiment, a cap 90 is used to protect the proximal end 32 of the spindle body, including the threaded fastener 42, washer 40, and cotter pin 44 from exposure to all environmental elements. In particular, the area around the threaded fastener 42 is prone to severe galvanic corrosion, especially when the trailer is used for salt water boat hauling. The cap 90 resembles a conventional dust cap, having a continuous side wall 92 and top 94. A lip 96 wraps around a circumference of the sidewall 92, which limits depth insertion of a tab section 98, part of the continuous wall created beneath the lip 96. The tab section 98 frictionally engages a groove 100 formed on the inner surface 22 of the torsion arm 10. Preferably, an anaerobic compound or silicone sealant is used to seal the cap 90 to the torsion arm 10. The threaded fastener 42, washer 40, cotter pin 44, and proximal end 32 are covered with a protectant or grease prior to assembling the cap 90 to the torsion arm 10. The groove is machined into the inner surface 22 of the torsion arm 10, forming a receptacle that is constructed and arranged to frictionally engage the cap 90.

The purpose of having a replaceable spindle body is to permit replacement without having to forgo replacement of the torsion bar or hub assembly. For instance, in the instance of an extreme bearing failure, the spindle will be destroyed. The idea is to have a replaceable spindle that can be repaired on the side of the road. However, galvanic corrosion of the proximal end with dissimilar metals forming the nut, washer and cotter pin are known to prohibit the intended replacement of the spindle body making it necessary to cut or torch off the fastener in an attempt to save the torsion arm. The speed of corrosion of the materials is remarkable, hastened by salt water exposure, as well as cycling of temperature, which occurs when the trailer bearings create heat through normal friction.

Figure 2:
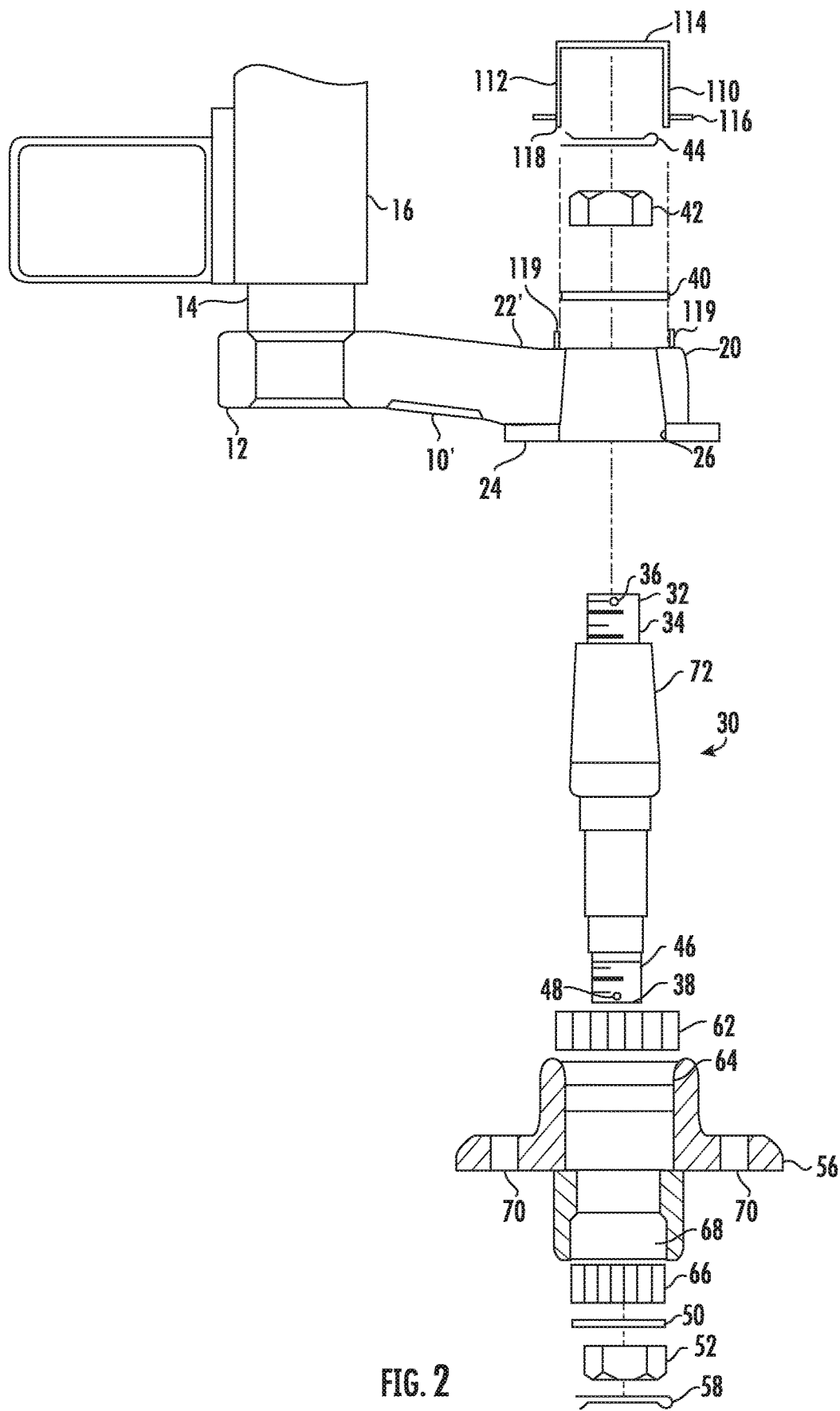
FIG. 2 is an exploded cross sectional side view of a spindle assembly with a collared housing and fastener cover.

FIG. 2 is an exploded cross sectional side view of a spindle assembly with a collared housing and fastener cover. Illustrated is a torsion arm 10 having a proximal end 12 coupled to a torsion bar 14. The torsion bar 14 in the preferred embodiment has a square shaped bar placed within a square tube housing 16. The torsion arm 10' is further defined by a distal end 20 with an inside surface 22' and an outside surface 24 defining a tapered open-ended spindle axle socket 26 there between.

The spindle axle 30 is releasable securable to the torsion arm 10'; the spindle axle having a proximal end 32 that is threaded 34 with a first cotter key hole 36. The proximal end receives a washer 40 and threaded fastener 42 to prevent the proximal end from passing through the spindle axle socket 26 once installed. A first cotter key 44 is positioned in the first cotter key hole 36 to inhibit movement of the threaded fastener 42.

The distal end 38 of the spindle axle 30 is threaded 46 with a second cotter key hole 48. The distal end 38 receives the washer 50 and threaded fastener 52 to prevent the distal end from passing through the wheel hub assembly 56 once installed. A second cotter key 58 is positioned in the second cotter key hole 48 to inhibit movement of the threaded fastener 52. The wheel hub assembly includes an inner bearing 62 for engaging an inner race 64 and an outer bearing 66 for engaging an outer race 68. The hub assembly 56 is used for mounting a wheel, not shown, using the wheel bolt holes 70.

The spindle axle 30 includes a tapered body 72 for mounting in the spindle axle socket 26 of the torsion arm 10', such that the proximal end 32 extends through the spindle axle socket 26 to the inside surface 22'. The threaded fastener 42 is tightened to the proximal end 32 with reciprocal threads 34, securing the spindle axle 30 to the torsion arm 10'. In this embodiment, a cap 110 is used to protect the proximal end 32 of the spindle body, including the threaded fastener 42, washer 40, and cotter pin 44 from exposure to all environmental elements. The cap 110 resembles a conventional dust cap, having a continuous side wall 112 and top 114. A lip 116 wraps around a circumference of the sidewall 112, which limits depth insertion of a tab section 118, part of the continuous wall created beneath the lip 116. The tab section 118 frictionally engages a collar 119 formed on the inner surface 22' of the torsion arm 10'. Preferably, an anaerobic compound or silicone sealant is used to seal the cap 110 to the torsion arm 10. The threaded fastener 42, washer 40, cotter pin 44, and proximal end 32 are covered with a protectant or grease prior to assembling the cap 110 to the torsion arm 10'.

The collar 119 is machined into an inner edge of the tapered open-ended spindle axle socket 26. The collar 119 enlarges the edge of the socket 26, forming an opening that is constructed and arranged to frictionally engage the tab 118 of the cap 110.

Figure 3:
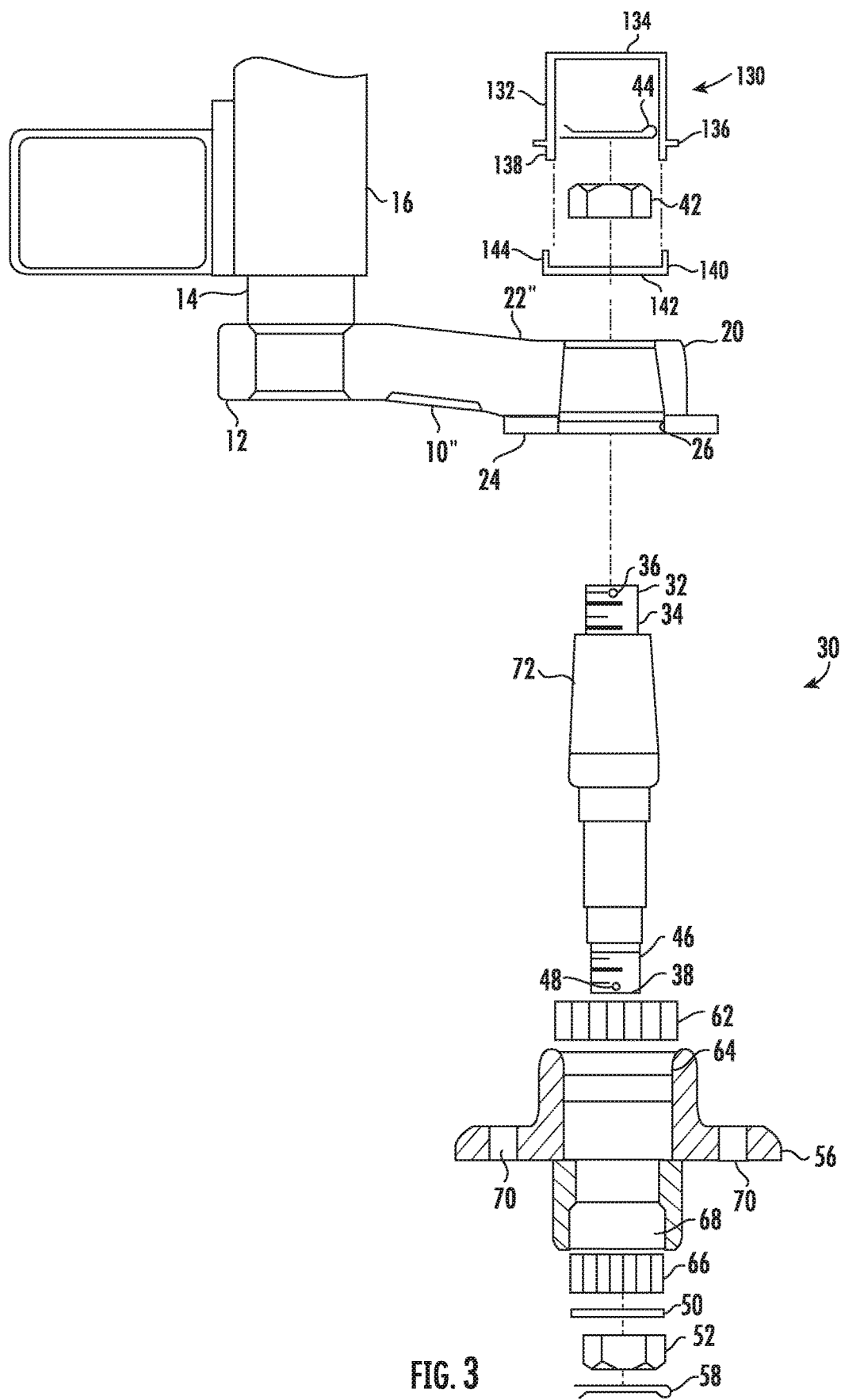
FIG. 3 is an exploded cross sectional side view of a spindle assembly with a collared washer to receive a fastener cover.

FIG. 3 is an exploded cross sectional side view of a spindle assembly with a collared washer to receive a fastener cover. Illustrated is a torsion arm 10" having a proximal end 12 coupled to a torsion bar 14. The torsion bar 14 in the preferred embodiment has a square shaped bar placed within a square tube housing 16. The torsion arm 10" is further defined by a distal end 20 with an inside surface 22" and an outside surface 24 defining a tapered open-ended spindle axle socket 26 there between.

The spindle axle 30 is releasable securable to the torsion arm 10"; the spindle axle having a proximal end 32 that is threaded 34 with a first cotter key hole 36. The proximal end for receiving a collared washer 140 and threaded fastener 42 to prevent the proximal end from passing through the spindle axle socket 26 once installed. A first cotter key 44 is positioned in the first cotter key hole 36 to inhibit movement of the threaded fastener 42.

The distal end 38 of the spindle axle 30 is threaded 46 with a second cotter key hole 48. The distal end 38 receives a washer 50 and threaded fastener 52 to prevent the distal end from passing through the wheel hub assembly 56 once installed. A second cotter key 58 is positioned in the second cotter key hole 48 to inhibit movement of the threaded fastener 52. The wheel assembly includes an inner bearing 62 for engaging an inner race 64 and an outer bearing 66 for engaging an outer race 68. The hub assembly is used for mounting a wheel, not shown, using the wheel bolt holes 70.

The spindle axle 30 includes a tapered body 72 for mounting in the spindle axle socket 26 of the torsion arm 10", such that the proximal end 32 extends through the spindle axle socket 26 to the inside surface 22". The threaded fastener 42 is tightened to the proximal end 32 with reciprocal threads 34, securing the spindle axle 30 to the torsion arm 10". In this embodiment, a cap 130 is used to protect the proximal end 32 of the spindle body, including the threaded fastener 42, collared washer 140 and cotter pin 44 from exposure to all environmental elements. The cap 130 resembles a conventional dust cap, having a continuous side wall 132 and top 134. A lip 136 wraps around a circumference of the sidewall 132, which limits depth insertion of a tab section 138, part of the continuous wall created beneath the lip 136. In this embodiment, a collared washer 140 is employed positioned between the threaded fastener and the torsion bar housing 10". The collared washer 140 is defined as a circular plate 142 with a raised rim 144 around an outer diameter of the circular plate 142. The circular plate 142 has a centrally disposed aperture sized to receive the proximal end 32 of the spindle axle 30. The tab section 138 frictionally engages the collar 144. Preferably, an anaerobic compound or silicone sealant is used to seal the cap 130 to the torsion arm 10". The threaded fastener 42, collared washer 140, cotter pin 44, and proximal end 32 are covered with a protectant or grease prior to assembling the cap 110 to the torsion arm 10".

The collared washer 140 is frictionally engaged into the inner edge of the tapered open-ended spindle axle socket 26. Silicone Sealant is used to seal the collared washer 140 to the tapered open ended spindle socket 26. The collar 140 enlarges the edge of the socket 26, forming an opening that is constructed and arranged to frictionally engage the cap tab 138 of the cap 130.

Figure 4:
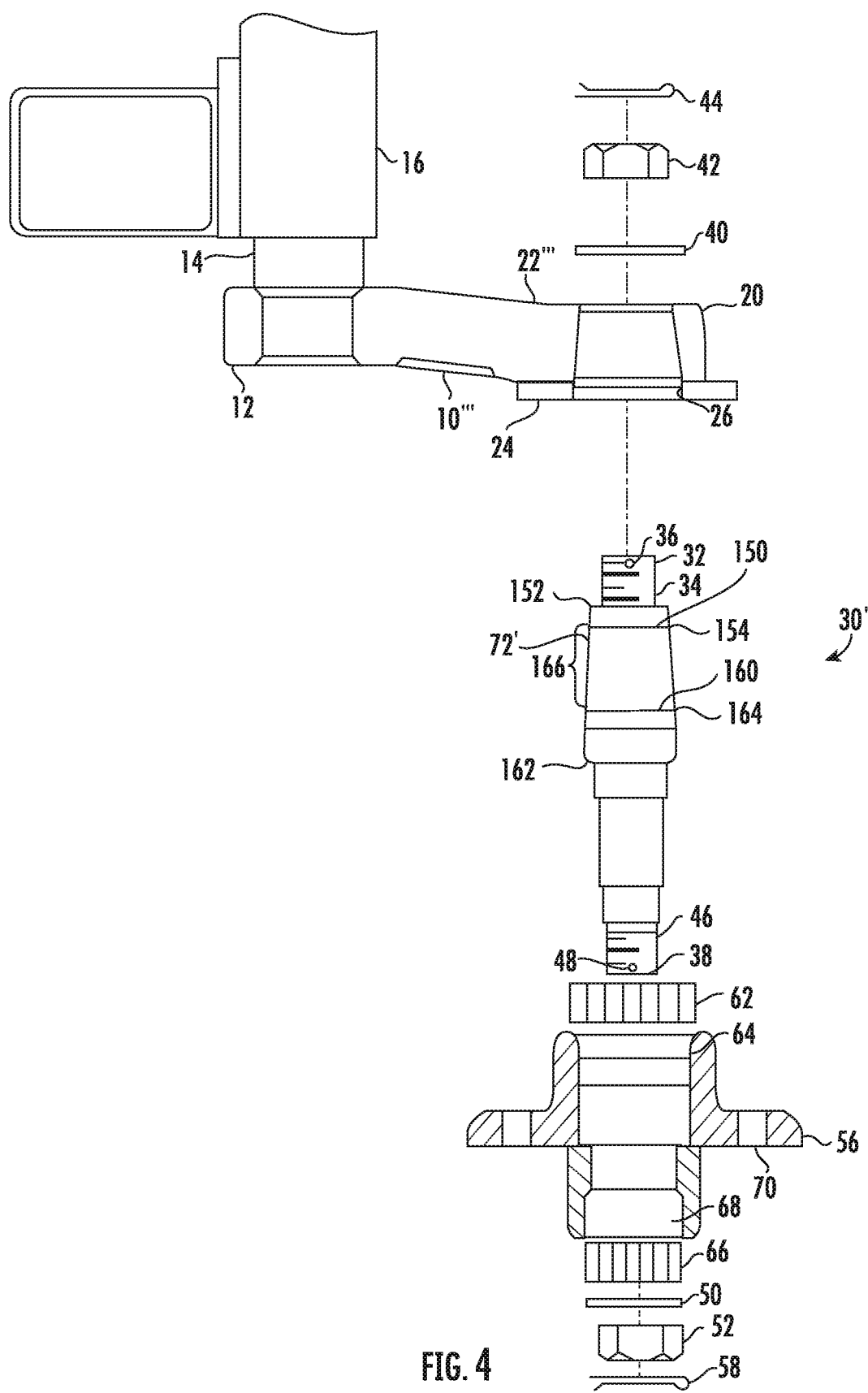
FIG. 4 is an exploded cross sectional side view of a spindle assembly with a modified spindle to form a hermetically sealed spindle.

FIG. 4 is an exploded cross sectional side view of a removable spindle assembly with a modified spindle to form a hermetically sealed spindle. Illustrated is a torsion arm 10''' having a proximal end 12 coupled to a torsion bar 14. The torsion bar 14 in the preferred embodiment has a square shaped bar placed within a square tube housing 16. The torsion arm 10''' is further defined by a distal end 20 with an inside surface 22''' and an outside surface 24 defining a tapered open-ended spindle axle socket 26 there between.

The spindle axle 30' is releasable securable to the torsion arm 10'''; the spindle axle having a proximal end 32 that is threaded 34 with a first cotter key hole 36. The proximal end receives washer 40 and threaded fastener 42 to prevent the proximal end from passing through the spindle axle socket 26 once installed. A first cotter key 44 is positioned in the first cotter key hole 36 to inhibit movement of the threaded fastener 42.

The distal end 38 of the spindle axle 30' is threaded 46 with a second cotter key hole 48. The distal end 38 receives washer 50 and threaded fastener 52 to prevent the distal end from passing through the wheel hub assembly 56 once installed. A second cotter key 58 is positioned in the second cotter key hole 48 to inhibit movement of the threaded fastener 52. The wheel assembly includes an inner bearing 62 for engaging an inner race 64 and an outer bearing 66 for engaging an outer race 68. The hub assembly is used for mounting a wheel, not shown, using the wheel bolt holes 70.

The spindle axle 30' includes a tapered body 72' for mounting in the spindle axle socket 26 of the torsion arm 10''', such that the proximal end 32 extends through the spindle axle socket 26 to the inside surface 22'''. The threaded fastener 42 is tightened to the proximal end 32 with reciprocal threads 34, securing the spindle axle 30 to the torsion arm 10'''. In this embodiment, the spindle axle 30 includes a first O-ring groove 150 formed along a first end 152 of the tapered body 72' for receipt of a first O-ring 154. A second O-ring groove 160 is formed along a second end 162 of the tapered body 72' for receipt of a second O-ring 164. The first and second O-rings 154, 164 hermetically seal an area 166 there between when the spindle axle 30' is attached to the torsion arm 10'''. It is reminded that the spindle axle does not rotate. By maintaining a hermetically sealed area 166, the spindle cannot seize the torsion arm 10'''. Corrosion that may occur along the first end 152 or second end 162 will not be able to penetrate the O-rings and, during the removal stage, any corrosion will not be sufficient to seize the spindle axle 30' to the torsion arm 10'''. Preferably, the sealed area 166 is covered with a protectant or grease prior to assembling to the torsion arm 10'''.

Figure 5:
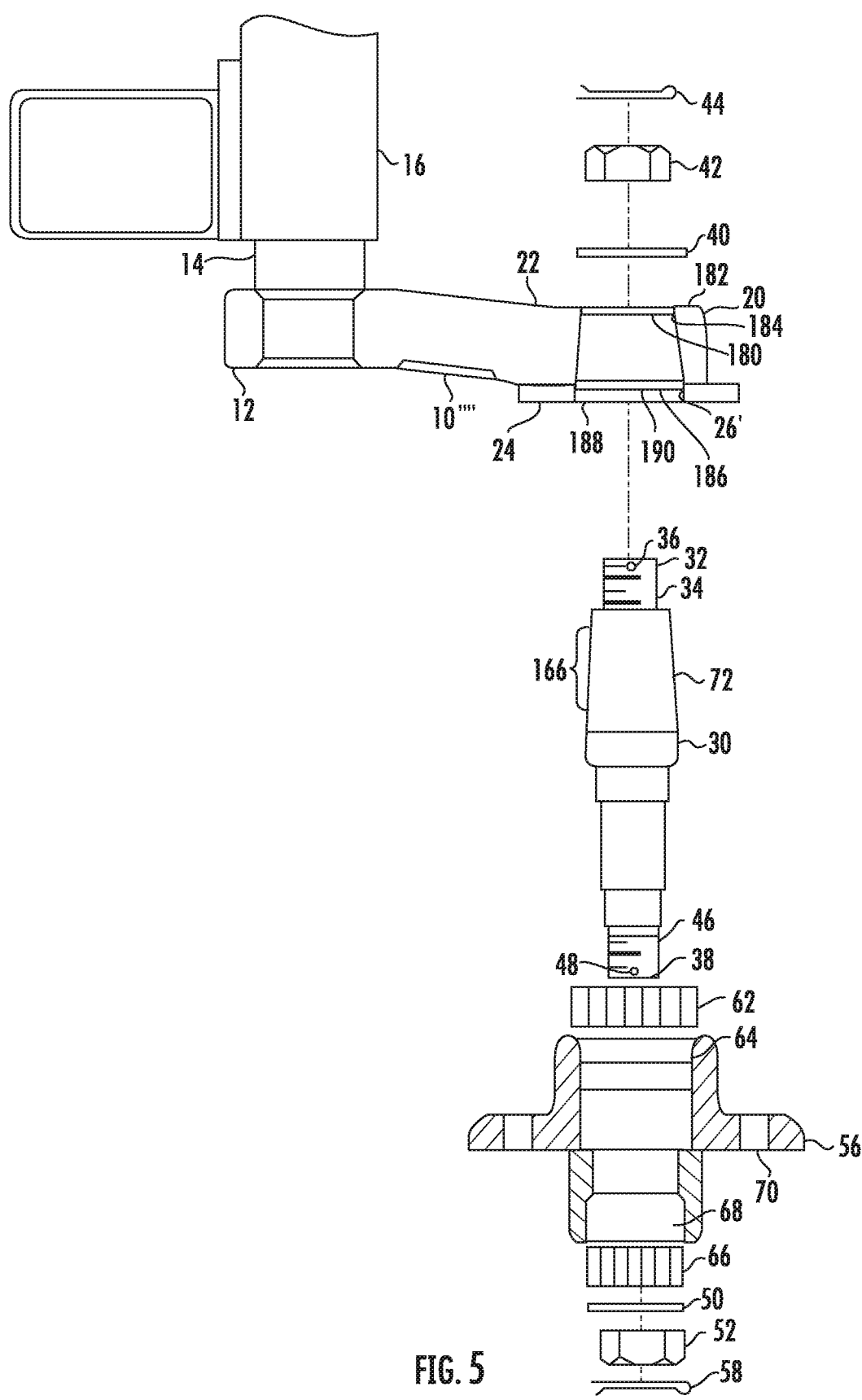
FIG. 5 is an exploded cross sectional side view of a spindle assembly with a modified housing to form a hermetically sealed spindle.

FIG. 5 is an exploded cross sectional side view of a spindle assembly with a modified housing to form a hermetically sealed spindle. Illustrated is a torsion arm 10'''' having a proximal end 12 coupled to a torsion bar 14. The torsion bar 14, in the preferred embodiment, has a square shaped bar placed within a square tube housing 16. The torsion arm 10'''' is further defined by a distal end 20 with an inside surface 22 and an outside surface 24 defining a tapered open-ended spindle axle socket 26' there between.

The spindle axle 30 is releasable securable to the torsion arm 10''''; the spindle axle having a proximal end 32 that is threaded 34 with a first cotter key hole 36. The proximal end receives washer 40 and threaded fastener 42 to prevent the proximal end from passing through the spindle axle socket 26' once installed. A first cotter key 44 is positioned in the first cotter key hole 36 to inhibit movement of the threaded fastener 42.

The distal end 38 of the spindle axle 30 is threaded 46 with a second cotter key hole 48. The distal end 38 receives a washer 50 and threaded fastener 52 to prevent the distal end from passing through the wheel hub assembly 56 once installed. A second cotter key 58 is positioned in the second cotter key hole 48 to inhibit movement of the threaded fastener 52. The wheel assembly includes an inner bearing 62 for engaging an inner race 64 and an outer bearing 66 for engaging an outer race 68. The hub assembly is used for mounting a wheel, not shown, using the wheel bolt holes 70.

The spindle axle 30 includes a tapered body 72 for mounting in the spindle axle socket 26' of the torsion arm 10"", such that the proximal end 32 extends through the spindle axle socket 26' to the inside surface 22. The threaded fastener 42 is tightened to the proximal end 32 with reciprocal threads 34 securing the spindle axle 30 to the torsion arm 10"". In this embodiment, the torsion arm housing 10"" includes a first O-ring groove 180 formed along a first end 182 of the spindle axle socket 26' near the inner surface 22 for receipt of a first O-ring 184 and a second O-ring groove 186 formed along a second end 188 of the spindle axle socket 26' for receipt of a second O-ring 190. The first and second O-rings 184, 190 hermetically seal an area 166 of the spindle axle 30 when attached to the torsion arm body 10"".

Figure 6:
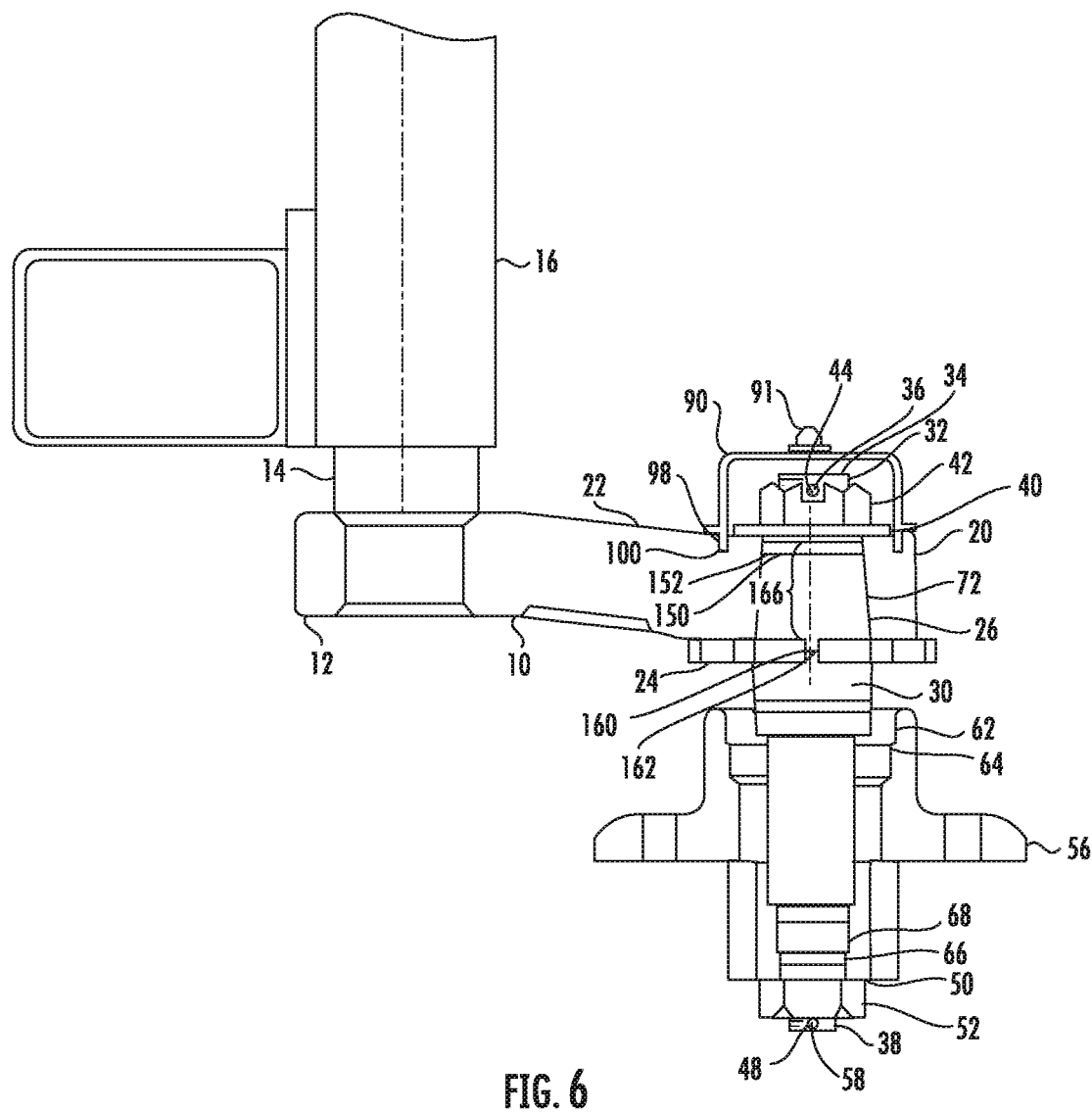
FIG. 6 is a side view of a spindle assembly having a spindle threaded fastener cover and a hermetically sealed spindle.

Referring to FIG. 6, a side view of a spindle assembly with a spindle threaded fastener cover and sealed spindle is depicted. The torsion arm 10 has a proximal end 12 that is coupled to a torsion bar 14. The torsion bar 14, in the preferred embodiment, has a square tube housing 16. The torsion arm 10 is further defined by a distal end 20 with an inside surface 22 and an outside surface 24 defining a tapered open-ended spindle axle socket 26 there between.

A spindle axle 30 is releasable securable to the torsion arm 10; the spindle axle having a proximal end 32 that is threaded 34 with a first cotter key hole 36. The proximal end 32 receives a washer 40 and threaded fastener 42 to prevent the proximal end 32 from passing through the spindle axle socket 26 once installed. A first cotter key 44 is positioned in a cotter key hole to inhibit movement of the castle nut threaded fastener 42.

The distal end 38 of the spindle axle 30 receives a washer 50 and threaded fastener 52 to prevent the distal end from passing through the wheel hub assembly 56 once installed. A second cotter key 58 is positioned in a second cotter key hole 48 to inhibit movement of the threaded fastener 52. The wheel hub assembly includes an inner bearing 62 for engaging an inner race 64 and an outer bearing 66 for engaging an outer race 68.

Cap 90 is used to protect the proximal end 32 of the spindle body, including the threaded fastener 42, washer 40, and cotter pin 44 from exposure to all environmental elements. The cap 90 resembles a conventional dust cap, and may include a grease zerk fitting 91. Tab section 98 frictionally engages a groove 100 formed on the inner surface 22 of the torsion arm 10. In this embodiment, the spindle axle 30 includes a first O-ring groove 150 formed along one end of the tapered body 72 for receipt of a first O-ring 152. A second O-ring groove 160 is formed along a second end of the tapered body 72 for receipt of a second O-ring 162. The first and second O-rings 152, 162 hermetically seal an area 166 there between when the spindle axle 30 is attached to the torsion arm body 10.

Figure 7:
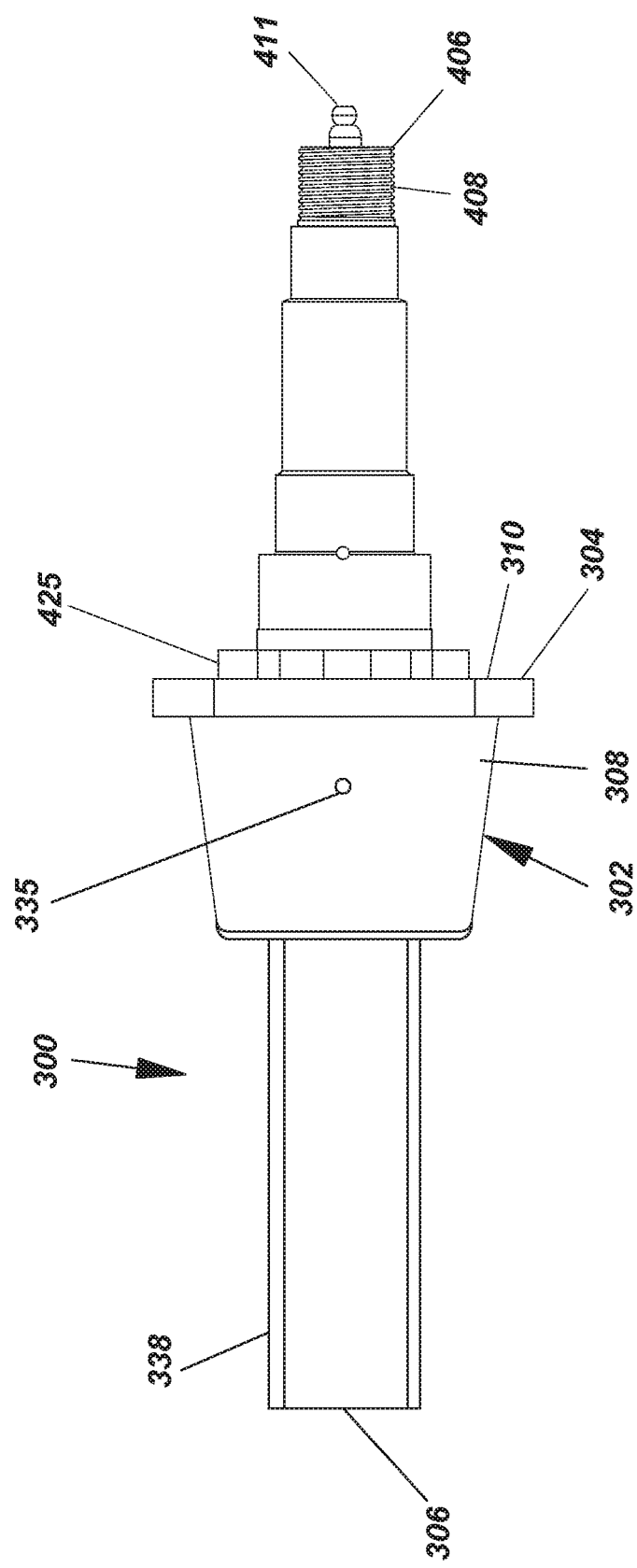
FIG. 7 is top perspective view of a spindle housing end unit with a removable spindle that when assembled is having a threaded socket cavity for attaching a threaded spindle that is sealed from the environment.
Figure 8:
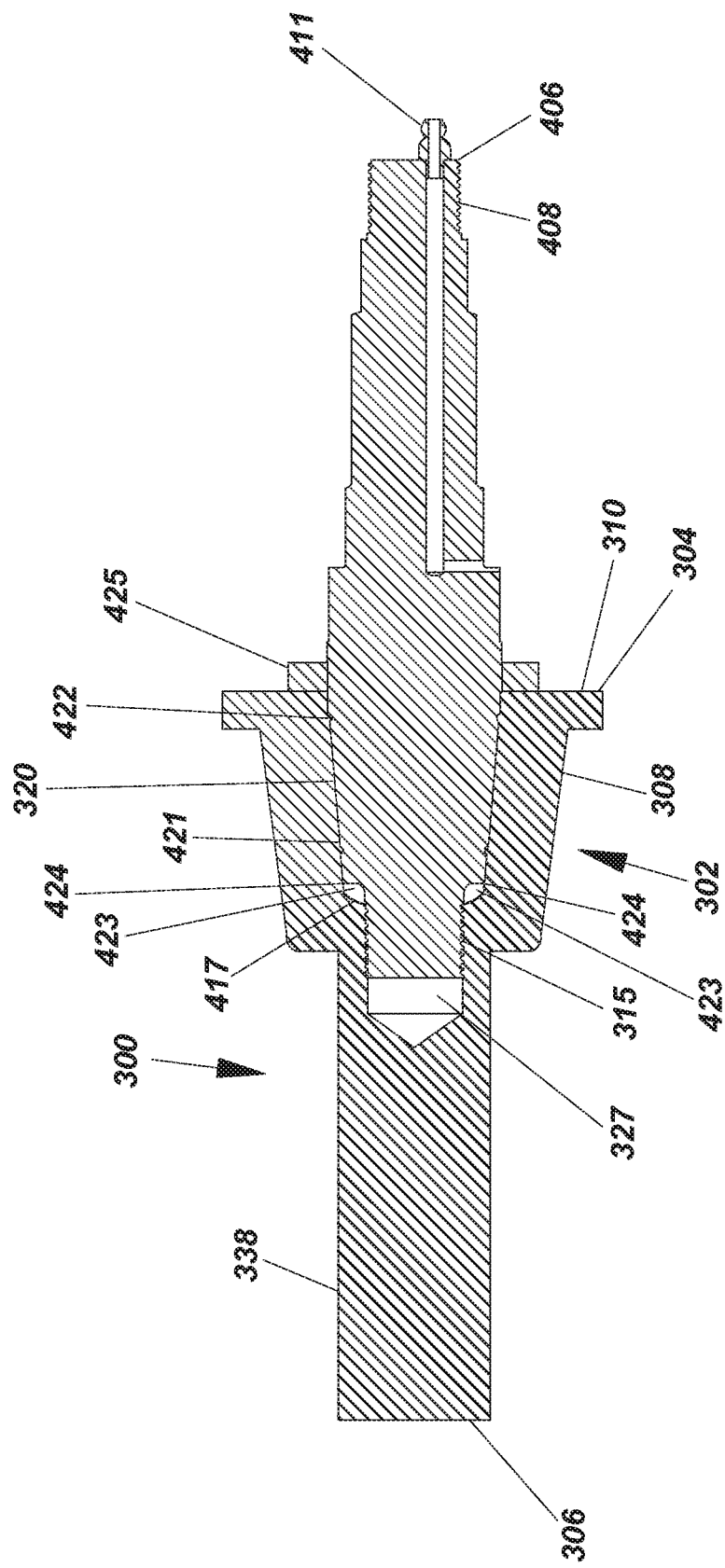
FIG. 8 is a top cross sectional view of a spindle housing end unit having a threaded socket cavity for attaching a threaded spindle that is sealed from the environment.
Figure 10:
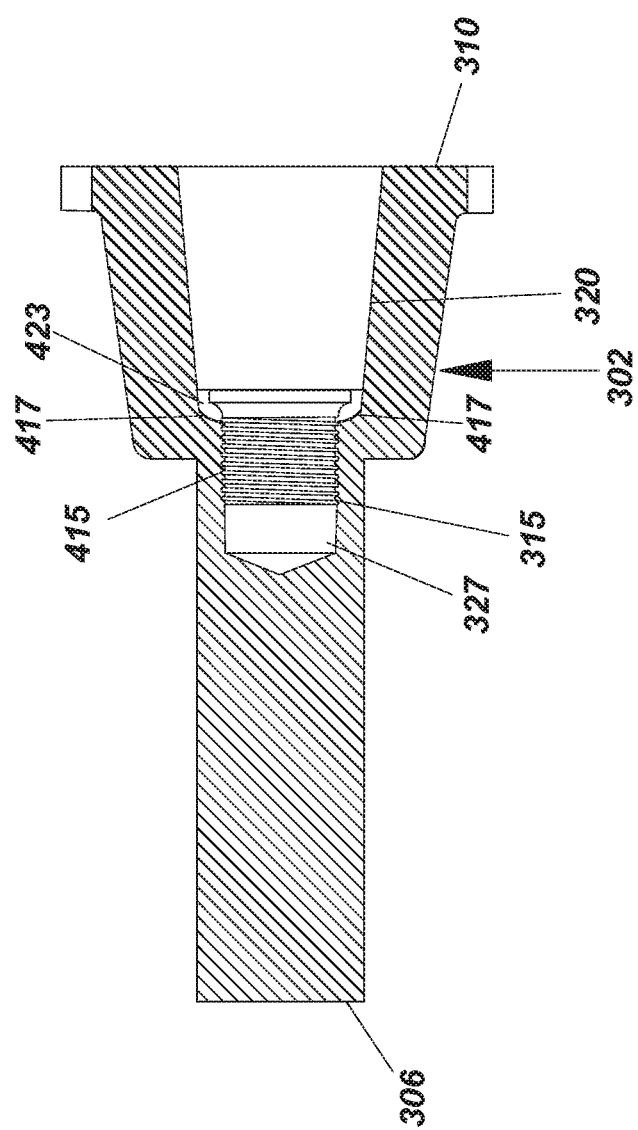
FIG. 10 is a top cross sectional view of the spindle housing end unit with a threaded socket cavity.

Referring to FIGS. 7-8, 10, disclosed is an embodiment of a sealed removable spindle housing end unit assembly 300 comprising of a spindle housing end unit and a removable spindle. The spindle housing end unit 302 having a proximate end 304 and a distal end 306. The spindle housing end unit's proximate end 304 has a socket cavity 308 with a brake flange 310. The socket cavity 308 has a tapered section 320 that terminates with a threaded cavity section 315. The diameter of the threaded cavity section 315 is dimensioned to have a diameter that is less than the tapered section. The spindle housing end unit 302 has at least one aperture 335 configured for cooperation with a set screw or other suitable fastener for fixedly securing the removable spindle. The distal end of the spindle 406 has threads 408 configured for attaching to a hub assembly. The distal end of the spindle 406 also includes a zerk grease fitting 411 for facilitating proper lubrication of the spindle housing 302.

Figure 9A:
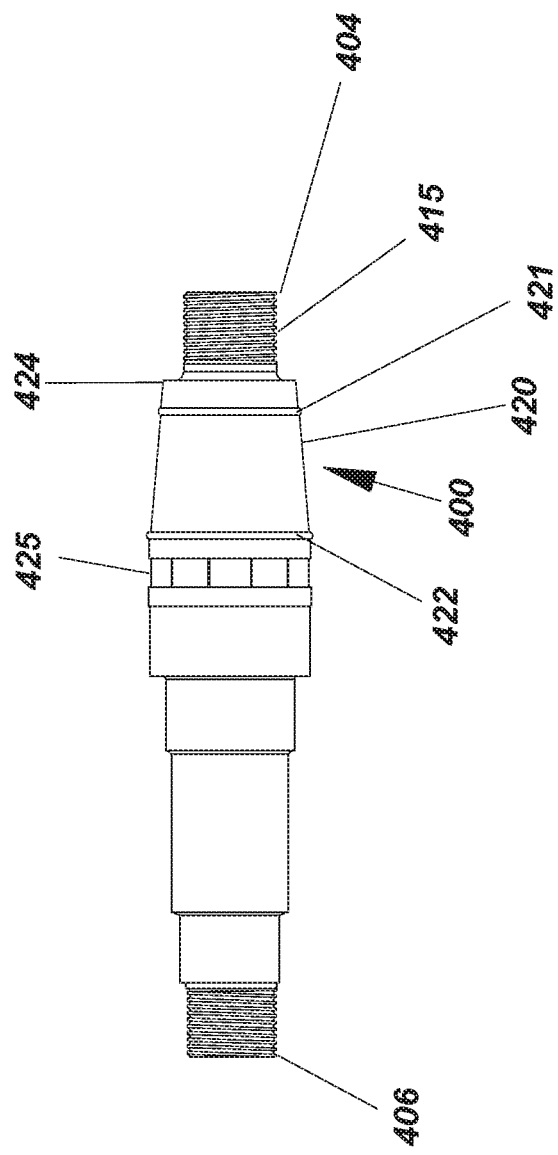
FIG. 9A is a top perspective view of the threaded removable spindle that is made to assemble to a spindle housing end unit.
Figure 9B:
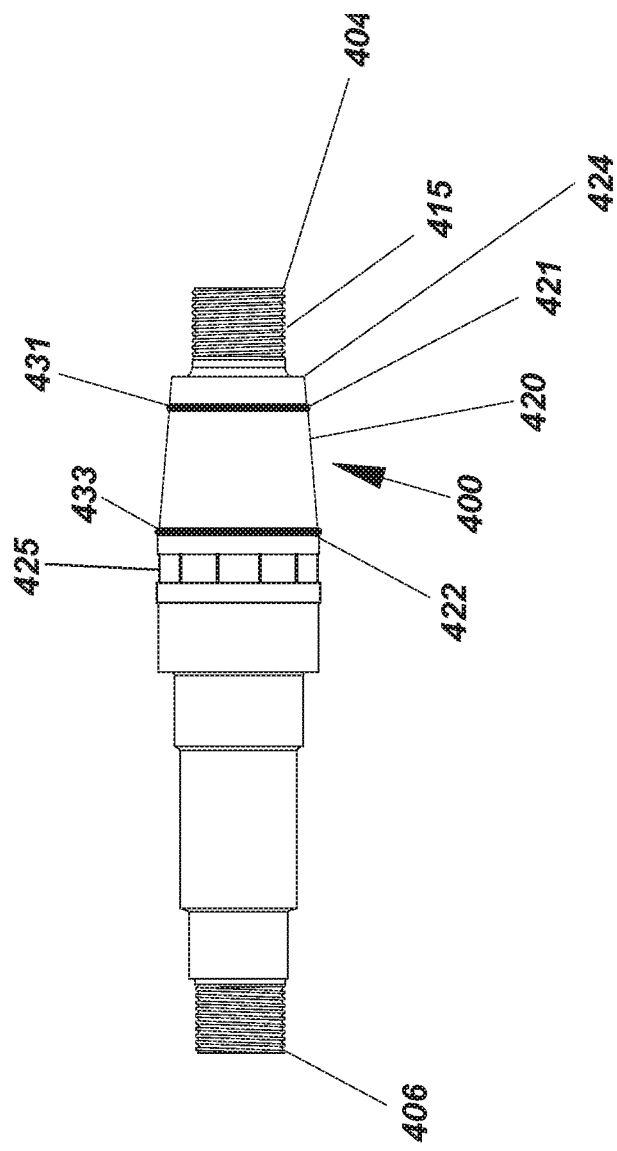
FIG. 9B is a top perspective view of the threaded removable spindle with O-Rings installed.

Referring to FIGS. 9A and 9B, the removable spindle further includes a spindle that is defined as having a proximate end 404 and distal end 406. The spindle proximate end 404 has threads 415 that are constructed and arranged to cooperate with the spindle housing end unit's socket threaded cavity 315. Adjacent to the spindle's proximate end threads 415 is a tapered section 420 constructed and arranged to cooperate with the spindle housing end unit's socket cavities taper section 320. The distal end of the spindle 406 has threads configured to attach a hub assembly (not shown). The distal end of the spindle also includes a zerk grease fitting for facilitating proper lubrication of the spindle.

The removable spindle section 420 has at least one annular groove. In one embodiment, as illustrated in FIGS. 8, 9A, and 9B, the removable spindle section 420 has a first annular groove 421 spaced apart from a second annular groove 422. The annular grooves are constructed and arranged to cooperate with a first O-ring 431 and a second O-ring 433.

Referring to FIGS. 8 and 10, it is contemplated that the socket cavity 327 and 423 will have sufficient space to accommodate the spindle and any excess amount of grease or other lubricant when the removable spindle is completely tightened. It is reminded that the spindle axle does not rotate. The installations of O-Rings 431 and 433 in the annular grooves 421 and 422 are designed to hermetically seal the area between the two annular grooves. The configuration is designed to prevent the removable spindle from seizing within the spindle housing end unit 302. Corrosion that may occur along the spindle length will not be able to penetrate the O-rings. Accordingly, prevention of corrosion to avoid seizing of the removable spindle in the spindle housing end unit 302, thereby facilitates easy removal. Preferably, the sealed area created within socket cavities tapered section 320 is covered with a protectant or grease prior to assembling to the spindle housing end unit 302.

Referring to FIGS. 8-13, the removable spindle tapered section 420 is adjacent to a dodecagon shaped surface 425. In a preferred embodiment, the dodecagon shaped surface 425 will have a 12-point dodecagon section having 12 points evenly spaced at 30 degrees around the removable spindle assembly 400, positioned to be left exposed when the removable spindle assembly 400 is threadably inserted into the spindle housing end unit 302.

Figure 11:
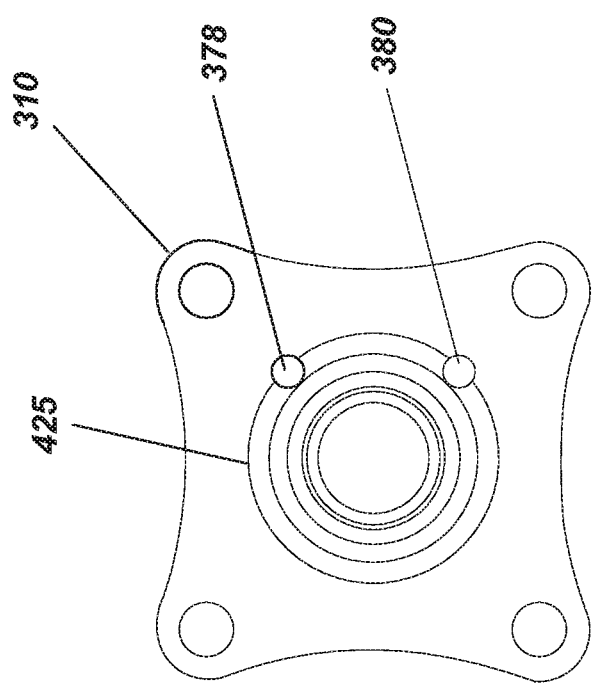
FIG. 11 is a front view of the brake flange of the spindle housing end unit.
Figure 13:
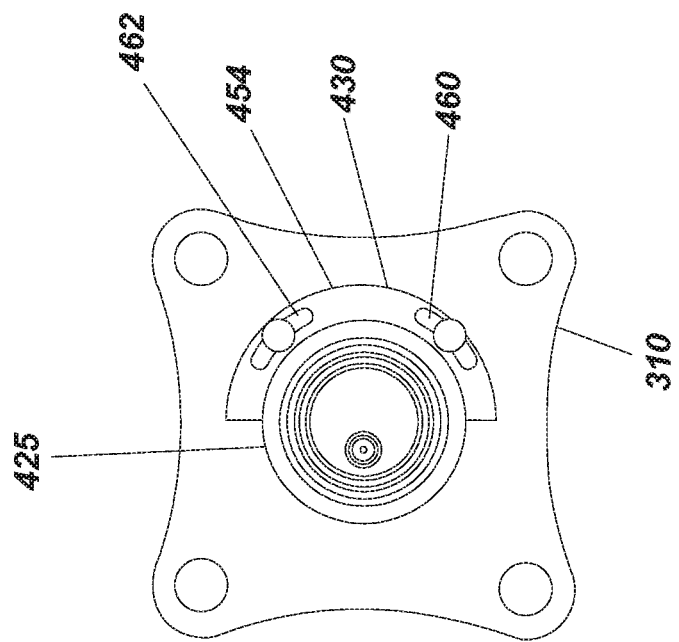
FIG. 13 is a front view of the brake flange with the shaped key attached to the spindle housing end unit to prevent rotation of the removable spindle.
Figure 12:
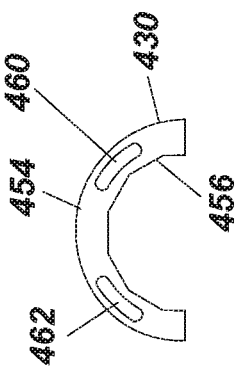
FIG. 12 is a top perspective view of a shaped key.
Figure 14:
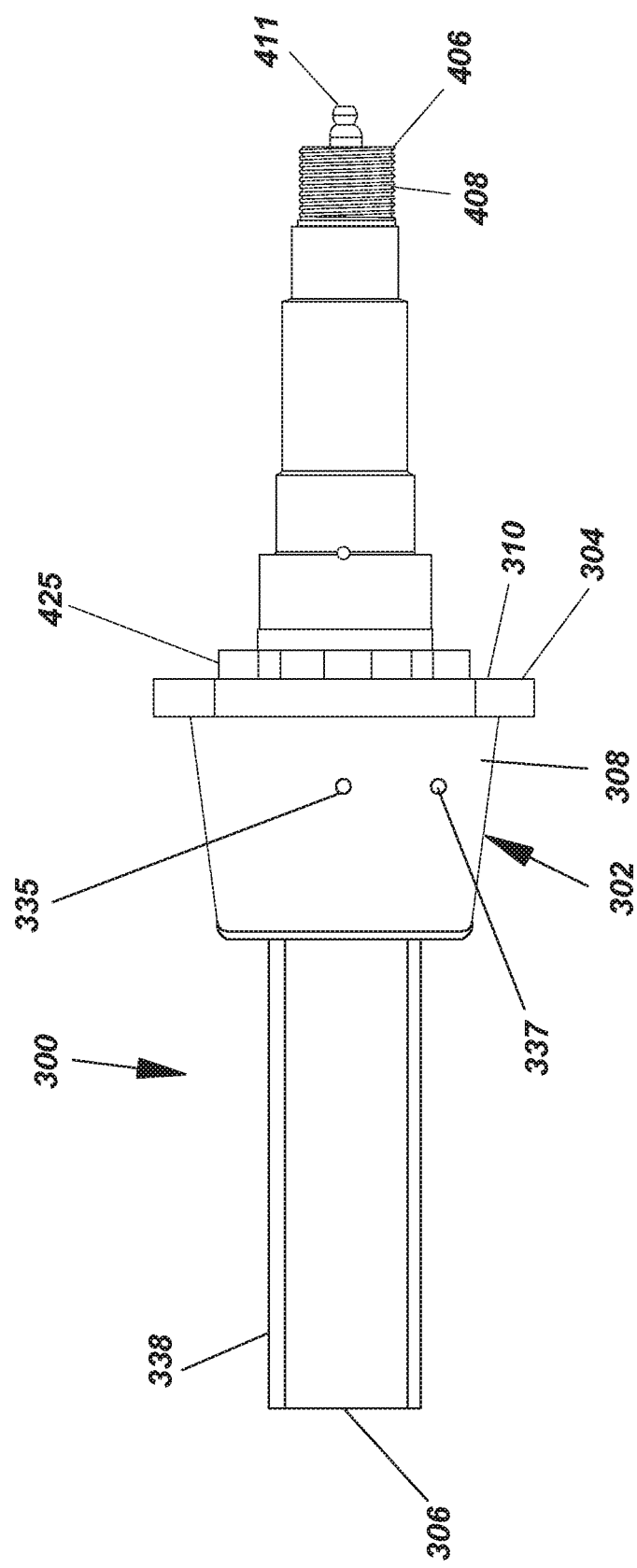
FIG. 14 is top perspective view of a spindle housing end unit with a removable spindle having at least two set screws for engaging an internal 12 point dodecagon deviation.
Figure 15A:
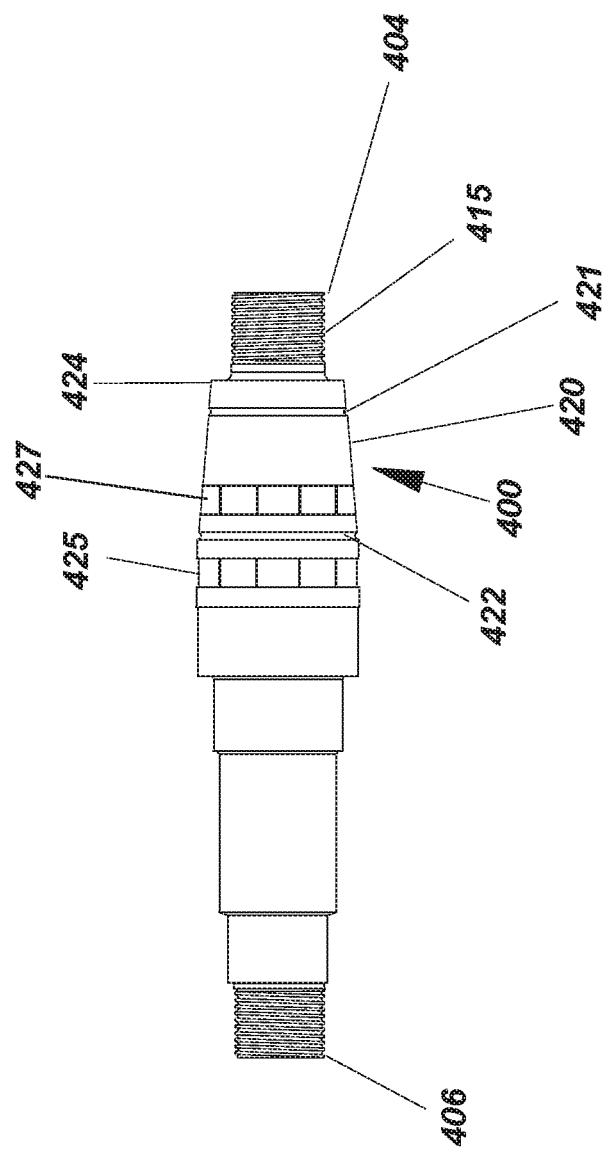
FIG. 15A is a top perspective view of the threaded removable spindle that having a 12 point dodecagon deviation made to assemble to a spindle housing end unit.
Figure 15B:
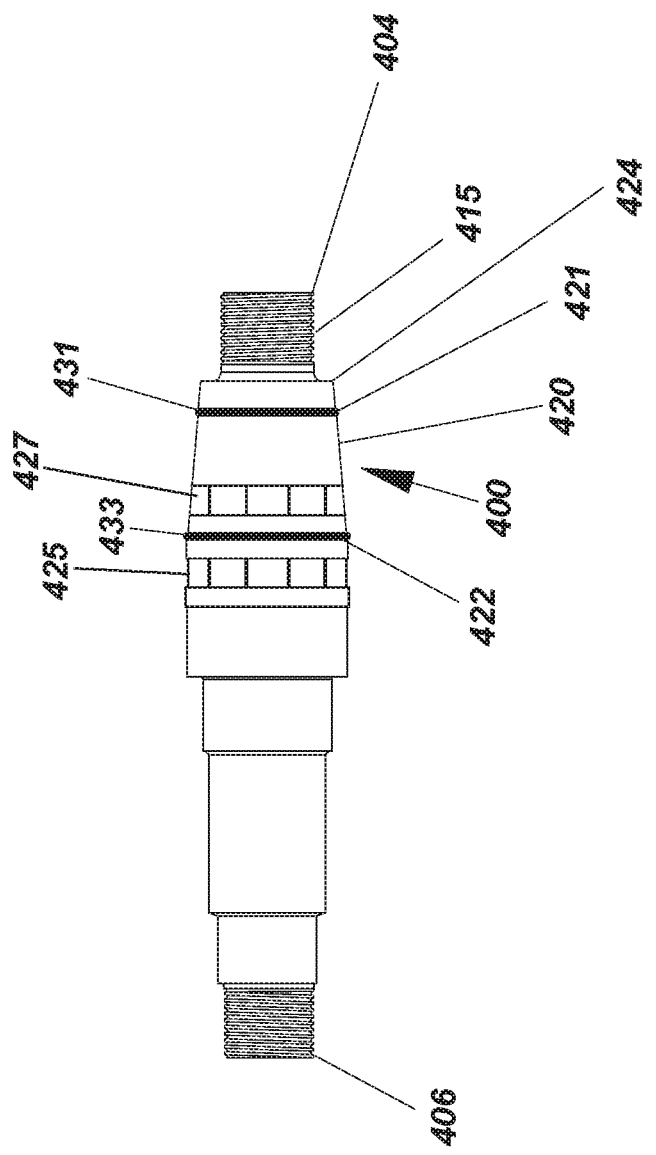
FIG. 15B is a top perspective view of the threaded removable spindle of FIG. 15A with O-Rings installed.

As shown in FIGS. 11-13, a semi-circular key 430 having a smooth outer edge 454 and an inner dodecagon edge 456 which slidably engages the dodecagon surface 425 for the purpose of providing an additional anti-loosening retainer and a visual indicator of detainment of the sealed removable spindle housing end unit assembly 300. The key 430 has slots 460 and 462, for insertion of fasteners, to fixedly attach the key inside the brake flange 310 apertures 378 and 380. In an exemplary embodiment, bolts with corresponding threaded holes would be used to fasten the key 430 into place. The dodecagon shaped key is always contemplated to be configured to interlock with the dodecagon shaped surface on the spindle for fixedly attaching to inside the brake flange as another means to facilitate securing of the spindle.

Referring to FIGS. 8-10, when the removable spindle is torqued into the threaded socket cavity of the spindle housing end unit of upwards of 100 ft. lbs., it is desirable to have complete thread and taper engagement. Accordingly, the socket cavity includes a relief section 423 that prevents the removable spindle's inner taper 424 from bottoming out in the spindle housing end unit and not engaging all the threads. Additionally, the cavity 327 functions as a space for excess grease and lubricant to expand while the removable spindle is torqued into the spindle housing end unit. Adjacent the threads is section 417, a lead in sized of a diameter greater than the threads 415, that further assists in the proper placement of the spindle in the threaded socket cavity.

Referring to FIG. 8, in one exemplary embodiment, the sealed removable spindle housing end unit assembly is comprised of steel. However, any suitable material for this application is understood to be an acceptable substitute and does not deviate from the scope of the disclosed invention.

Referring to FIG. 7-8, the spindle housing end unit's shaft 338, is designed to be slip fitted and or abutted to an axle tube and welded to the axle tube to complete the axle on a trailer, and can be made into either a straight or drop spring axle. The spindle housing end unit's shaft 338 may be of either round, square or rectangular shape at the manufacturer's discretion.

The use of the removable spindle and the spindle housing end unit of the instant invention, together with a sealing of the spindle, assures the owner that the spindle can be easily removed should the spindle need to be replaced. The applicant has been awarded a number of patents for protection of the bearings, including U.S. Pat. Nos. 7,125,084; 7,226,133; 7,185,955; 7,740,036; and 8,205,526, the contents of which are incorporated herein by reference.

Referring to FIGS. 10, 14, 15A and 15B, set forth is an alternative embodiment of a sealed removable spindle housing end unit assembly 300 comprising of a spindle housing end unit and a removable spindle. The spindle housing end unit 302 having a proximate end 304 and a distal end 306. The spindle housing end unit's proximate end 304 has a socket cavity 308 with a brake flange 310. The socket cavity 308 has a tapered section 320 that terminates with a threaded cavity section 315. The diameter of the threaded cavity section 315 is dimensioned to have a diameter that is less than the tapered section. The spindle housing end unit 302 has at least two apertures 335 and 337 configured for cooperation with a set screw or other suitable fastener for fixedly securing the removable spindle. As illustrated in FIGS. 9A and 9B, the removable spindle further includes a spindle that is defined as having a proximate end 404 and distal end 406. The spindle proximate end 404 has threads 415 that are constructed and arranged to cooperate with the spindle housing end unit's socket threaded cavity 315. Adjacent to the spindle's proximate end threads 415 is a tapered section 420 constructed and arranged to cooperate with the spindle housing end unit's socket cavities taper section 320. The distal end of the spindle 406 has threads configured to attach a hub assembly (not shown). The distal end of the spindle also includes a zerk grease fitting 411 for facilitating proper lubrication of the spindle.

The removable spindle section 420 has a first annular groove 421 spaced apart from a second annular groove 422. The annular grooves are constructed and arranged to cooperate with a first O-ring 431 and a second O-ring 433. In this embodiment, a hexagonal shaped surface 427 having a 12-point double hexagonal section with 12 points evenly spaced at 30 degrees around the removable spindle assembly 400 is positioned between the annular grooves 421, 422. The 12 point hexagonal shape is located in line with the set screw holes 335, 337 positioned in the spindle housing end unit 302. The set screw holes 335, 337 are preferably placed apart at an odd number of 15 degree increments. For example, the set screw hole 335 can be placed at 0, 30, 60, 90, 120 degrees and so forth and set screw hole 337 can be placed at 15, 45, 75, 105 degrees and so forth. While different points and degrees increment of separation is contemplated by this invention, the objective is the placement of at least two screw holes to assure at least one set screw is set into the 12 point, or the like point, hexagonal deviation to better secure the spindle from moving.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically.

The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A sealed removable spindle housing end unit assembly comprising:
   a spindle housing end unit having a proximate end and a distal end, said spindle housing end unit proximate end having a socket cavity with a brake flange, said socket cavity having a tapered section that terminates with a threaded cavity section of a diameter that is less than said tapered section;
   a removable spindle having a proximate and distal end, said spindle proximate end having threads constructed and arranged to cooperate with said spindle housing end unit socket threaded cavity, adjacent to said spindle proximate end threads is a tapered section constructed and arranged to cooperate with said spindle socket taper, a first annular groove formed along said spindle socket taper for receipt of a first O-ring and a second annular groove spaced apart from said first annular groove along said spindle socket taper for receipt of a second O-ring, said tapered section having a dodecagon shaped surface between said first O-ring and said second annular groove; wherein said first and said second O-rings hermetically seal an area along said spindle socket taper, said distal end of said spindle having threads configured to attach a hub assembly.

2. The sealed removable spindle housing end unit assembly according to claim 1, wherein said dodecagon shaped surface has 12 points.

3. The sealed removable spindle housing end unit assembly according to claim 1, wherein said spindle housing end unit has at least two apertures configured for cooperation with a sealed set screw for fixedly securing to said dodecagon shaped surface on said spindle.

4. The sealed removable spindle housing end unit assembly according to claim 3 wherein a first aperture of said at least two apertures is positioned at an even degree increment and a second aperture of said at least two apertures is positioned at an odd degree increment.

5. The sealed removable spindle housing end unit assembly according to claim 4 wherein said even increments consist of 0, 30, 60, 90, 120, 150, 180, 210, 240, 270, 300, 330 degrees and said odd increments consist of 15, 45, 75, 105, 135, 165, 195, 225, 255, 285, 315, 345 degrees.

6. The sealed removable spindle housing end unit assembly according to claim 1, wherein said threaded socket cavity includes an additional cavity that extends beyond said threaded cavity section to accommodate lubricant.

7. The sealed removable spindle housing end unit assembly according to claim 1, wherein said spindle housing end unit includes a relief cavity formed beneath said tapered removable spindle, said relief cavity constructed and arranged to provide an area that prevents said removable spindle from bottoming out in said spindle housing end unit allowing full thread and taper engagement when said removable spindle is torqued.

8. The sealed removable spindle housing end unit assembly according to claim 1, wherein said spindle housing end unit distal end can be slip fitted and fixedly attached by weldment into a spring axle existing manufactured axle tubing, thereby making a spring axle with a sealed removable spindle.

* * * * *